United States Patent
Schilling

(10) Patent No.: US 6,898,519 B1
(45) Date of Patent: May 24, 2005

(54) NAVIGATION SYSTEM WITH EXTENDED DISPLAY FUNCTION

(75) Inventor: Uwe Schilling, Solms (DE)

(73) Assignee: Mannesmann VDO AG, Frankfurt am Main (DE)

( * ) Notice: Subject to any disclaimer, the term of this patent is extended or adjusted under 35 U.S.C. 154(b) by 248 days.

(21) Appl. No.: 09/663,088

(22) Filed: Sep. 15, 2000

(30) Foreign Application Priority Data

Sep. 20, 1999 (DE) .......................................... 199 44 938

(51) Int. Cl.⁷ ............................................. G08G 1/123
(52) U.S. Cl. ................. 701/208; 701/117; 340/995.13; 340/995.19; 340/995.27; 342/357.1; 342/357.09
(58) Field of Search ................................. 701/208, 117; 342/357.09, 357.1, 357.13, 357.17, 357.3; 340/995.1, 995.13, 995.19, 995.2, 995.27, 995

(56) References Cited

U.S. PATENT DOCUMENTS

| | | | |
|---|---|---|---|
| 5,177,685 A | | 1/1993 | Davis et al. |
| 5,184,123 A | * | 2/1993 | Bremer et al. .............. 340/988 |
| 5,412,573 A | * | 5/1995 | Barnea et al. .............. 340/990 |
| 5,485,161 A | * | 1/1996 | Vaughn ................. 342/357.13 |
| 5,689,252 A | * | 11/1997 | Ayanoglu et al. ........... 340/991 |
| 5,862,509 A | * | 1/1999 | Desai et al. ................. 340/990 |
| 5,908,464 A | * | 6/1999 | Kishigami et al. .......... 340/988 |
| 5,948,042 A | * | 9/1999 | Heimann et al. ........... 701/208 |
| 5,968,109 A | * | 10/1999 | Israni et al. ................. 701/208 |
| 5,974,419 A | * | 10/1999 | Ashby ......................... 340/990 |
| 6,046,671 A | * | 4/2000 | Shimoura et al. ........... 340/439 |
| 6,122,593 A | * | 9/2000 | Friederich et al. .......... 701/200 |
| 6,150,961 A | * | 11/2000 | Alewine et al. .......... 340/995.1 |
| 6,182,006 B1 | * | 1/2001 | Meek ......................... 340/988 |

FOREIGN PATENT DOCUMENTS

| | | | |
|---|---|---|---|
| DE | 37 00 552 A1 | 7/1988 | |
| DE | 19519066 A1 | 5/1995 | |
| DE | 19640068 A1 | 9/1996 | |
| DE | 19648906 A1 | 11/1996 | |
| DE | 19714323 A1 | 3/1997 | |
| DE | 19725075 A1 | 6/1997 | |
| EP | 697580 A1 * | 2/1996 | ........... G01C/21/20 |

* cited by examiner

*Primary Examiner*—Richard M. Camby
*Assistant Examiner*—Eric M. Gibson
(74) *Attorney, Agent, or Firm*—Mayer, Brown, Rowe & Maw LLP; Richard A. Speer

(57) ABSTRACT

The invention relates to navigation systems for motor vehicles, in which route planning information is output via a monitor (3). Data records containing map data are stored in a storage element (5). According to the invention, the storage element (5) stores information regarding traffic restrictions which is part of a data record of the map data, and the traffic restrictions relevant to the ascertained vehicle position can additionally be displayed on the monitor (3). Furthermore, in one specific embodiment, time restrictions for traffic restrictions are likewise stored and only the traffic restrictions which are applicable at the present time are displayed.

3 Claims, 2 Drawing Sheets

NAVIGATION SYSTEM WITH EXTENDED DISPLAY FUNCTION

BACKGROUND OF THE INVENTION

The subject of the invention is a navigation system for a motor vehicle containing a central processor connected to an input unit and to an output unit, to position determination means and to a storage element for map data, and means for associating an ascertained vehicle position with a data record, stored in the storage element, of the map data.

Such a navigation system is known from EP 0 363 396 B1, for example. Navigation systems in motor vehicles perform a number of functions. A first function is the calculation of a route between a starting location and a destination, with it generally being possible to choose between the fastest and the shortest route. After route calculation has been carried out, the task of the navigation system is to guide the motor vehicle driver to the destination. To this end, it is necessary for constant position determination to be carried out for the motor vehicle and for the motor vehicle position ascertained in this way to be matched to the map data stored in the navigation system. In this context, the route planning information is output via an output unit, with the information generally being output both visually and audibly. Such a known navigation system significantly assists a driver on journeys in an area with which he is not familiar. In particular, he is not obliged to be constantly looking at signs showing directions at the edge of the road. Nevertheless, the driver still needs to take note of a sometimes large number of other road signs showing regulations and restrictions. However, on the one hand, road signs at the edge of the road are easily overlooked, and, on the other hand, the driver may be unclear as to which particular restrictions are current on the section of road on which he is driving, especially when signs are frequently changing. This applies particularly to speed restrictions, for example. This problem may arise to a large extent particularly on inter-urban journeys with changing speed restrictions.

WO 97/35196 discloses electronic road signs. The electronic road sign has a transmitter transmitting the meaning of the road sign to a passing motor vehicle. The motor vehicle contains a corresponding receiver which receives the data transmitted by the electronic road sign, processes it and displays it using a display unit. The driver can thus always find out about the traffic restrictions existing on the section of road on which he is currently driving. However, a disadvantage of this is the high costs of the system, since each road sign needs to be provided with appropriate electronic equipment. Furthermore, an additional receiver and a display unit are also required in the motor vehicle itself.

The object of the invention is to modify a navigation system of the type described in the introduction such that, besides the route planning information, other important information relating to the road can also be displayed and can thus assist the driver of the vehicle.

The object is achieved in a navigation system of this generic type as a result of the feature that the storage element stores information about traffic restrictions which is part of a data record of the map data, and traffic restrictions relevant to the ascertained vehicle position can be displayed on the display unit.

BRIEF SUMMARY OF INVENTION

In the context of the invention, the complete blocking of roads to motor vehicle traffic or one-way street regulations are not regarded as traffic restrictions, since these do not constitute an actual restriction, rather these roads are not available to motor vehicle traffic at all or in particular directions of travel.

The traffic restrictions are preferably speed restrictions, height, width or length restrictions, weight restrictions and/or traffic restrictions for particular types of vehicle. As a result of these traffic restrictions being displayed in the vehicle, the driver of the vehicle is able at any time to find out about the currently applicable traffic restrictions by looking at the output unit of the navigation system.

By way of example, the speed restrictions can be restrictions to 80 km/h or 60 km/h on country roads or to 30 km/h in zones with traffic calming within built-up areas. Specifically in the case of speed restrictions to 30 km/h in zones with traffic calming within built-up areas, the speed restriction is generally indicated only when entering this zone. The traffic restriction is then lifted again by a road sign when leaving this zone. However, if a driver is driving in such a zone with traffic calming for a relatively long period of time, then he may easily no longer be clear as to which particular speed restriction is current. This is the case, for example, when he has left the vehicle in the meantime in order to do some shopping, for example. The situation is similar on inter-urban journeys where speed restrictions are frequently changing or apply over a relatively long section of road, but where there are appropriate road signs only at relatively long intervals. Here too, the situation may arise where the driver is not clear about the currently applicable maximum speed.

The navigation system according to the invention, in which the currently permissible maximum speed is constantly displayed on the output unit, can be used by the driver at any instant to find out about the currently applicable speed restriction. This results in a significant increase in traffic safety.

In addition to the display of the speed restrictions prescribed by road signs, in one specific embodiment, it is also possible for general speed restrictions for a particular type of road to be shown on the output unit. Thus, for example, when a vehicle is traveling along a country road outside built-up areas without specific speed restrictions, it is possible for the speed restriction of 100 km/h, which applies generally to this type of road in Germany, to be displayed on the output unit. The same applies for a general speed restriction within built-up areas of, for example, 50 km/h in the Federal Republic of Germany. Particularly on the fringes of built-up areas, it is therefore possible to eliminate the uncertainty which sometimes arises as to whether one is still within the built-up area or whether one is already outside it.

In addition to speed restrictions, the displayable traffic restrictions can, in particular, also be those for particular types of vehicle. This may relate, by way of example, to the display of an overtaking restriction for lorries, a speed restriction for lorries or a restriction on the transportation of dangerous goods. Since, however, the display of traffic restrictions for lorries, for example, is of no interest to a car driver, one particular embodiment provides that the type of vehicle can be selected in the navigation system and only the traffic restrictions relevant to the selected type of vehicle are displayed. The navigation system therefore reduces the information to the information required for the driver of a particular vehicle.

In some cases, particular traffic restrictions are time dependent. These include, by way of example, a restriction on lorries driving at night on a particular road, a speed restriction to 30 km/h in the period from 7.00 am to 2.00 pm in the area in front of a school, a speed restriction or an overtaking restriction for lorries on motorways during periods of rush-hour traffic, for example from 6.00 am to 9.00 am and from 3.00 pm to 7.00 pm, or a speed restriction at night to reduce noise. In order to ensure that the driver is reliably informed in such cases too, one specific embodiment of the invention provides that, for time dependent traffic restrictions, the information about the duration of time for which the traffic restriction is applicable is concurrently stored in the storage element. By comparing the time period for the speed restrictions with the current time of day, which is determined by means of a clock in the navigation system, it is possible to decide whether a traffic restriction is current at the time and needs to be displayed. Such a check and decision are usually performed by software in the navigation system's processor.

As a result of the traffic restrictions changing for particular sections of road, some of the corresponding information stored in the navigation system's storage element will, after a time, no longer be current. The information therefore needs to be regularly renewed. In the first instance, this can be done by replacing the storage element or by re-recording current information onto the storage element.

Particularly advantageously, the traffic restrictions stored on the storage element can be updated by downloading the data from a central computer. Mobile radio networks can advantageously be used for this. To this end, the navigation system can be connected to a mobile telephone and the information about the traffic restrictions can be updated via the mobile telephone. By way of example, by dialing a particular telephone number, the updated data record containing traffic restrictions can be transmitted by a central computer provided in a stationary transmission station in the mobile radio network. In this process, all the traffic restrictions for a particular region can be re-recorded, or else just those traffic restrictions which have changed, have been recently added or have been removed. In this context, the navigation system and the mobile telephone can be connected by means of a cable, but also, in particular, wirelessly.

One particular embodiment provides that the mobile telephone can be used to retrieve not only the information regarding the traffic restrictions but also the map data from a central computer in a stationary transmission station in the mobile radio network and to transmit it to the storage element. The advantage of this method is that the motor vehicle itself need contain only one storage element of comparatively low memory size and also, in particular, current map data is always available.

However, the information stored in the storage element regarding traffic restrictions may be used not just for display on a display unit, but rather may also be taken into account in route calculation. By way of example, this means that urban areas with a speed restriction of 30 km/h can be avoided during route calculation. Above all, speed restrictions with a time limit may likewise be taken into account in this case, such as a restriction on lorries driving at night on a particular road.

BRIEF DESCRIPTION OF THE DRAWINGS

The invention is explained in more detail below with the aid of an illustrative embodiment in the drawing, in which.

DETAILED DESCRIPTION OF THE INVENTION

Figure 1:
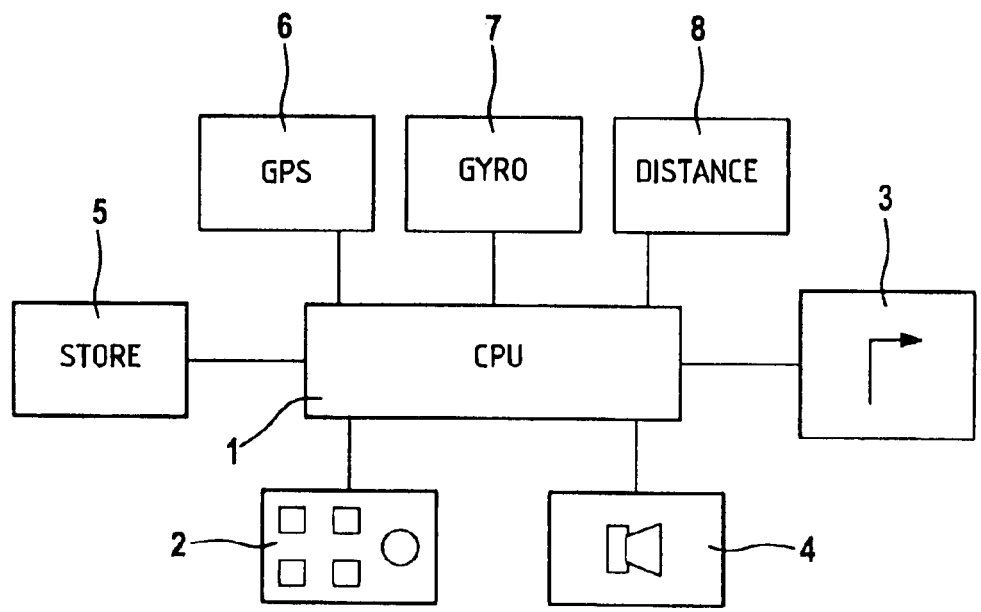
FIG. 1 shows the components of a navigation system.

FIG. 1 shows the essential components of a navigation system. The central component is the processor 1, which also contains the storage elements (RAM/ROM) necessary for its operation. Connected to the processor 1 is an input unit 2. The input unit 2 can be used to make various adjustments to the navigation system and to select a destination and possibly also the starting location. In this context, the destination can be entered, by way of example, by entering the full name of the destination or else by selecting it from a list shown on a visual output unit (monitor) 3. The route planning information is also output on the monitor 3. Furthermore, the route planning information can also be output via an audio output unit 4. The advantage of outputting it via an audio output unit 4 is that the driver is distracted less from the current traffic situation. A storage element 5 connected to the central processor 1 stores the map data in the form of data records. According to the invention, the storage element 5 additionally stores information about traffic restrictions and associates it with the data records. To determine the current vehicle position, the navigation system has a GPS receiver 6 designed to receive navigation signals from GPS satellites. However, since these GPS signals cannot always be received in urban areas, for example, the navigation system additionally has a direction sensor 7 and a distance sensor 8 for performing integrated navigation. The signals from the GPS receiver, from the distance sensor and from the direction sensor are processed in the central processor. The vehicle position ascertained from these signals is matched to the road map data by means of map matching, which is known. Finally, the route planning information obtained in this way is output via the monitor 3.

Figure 2:
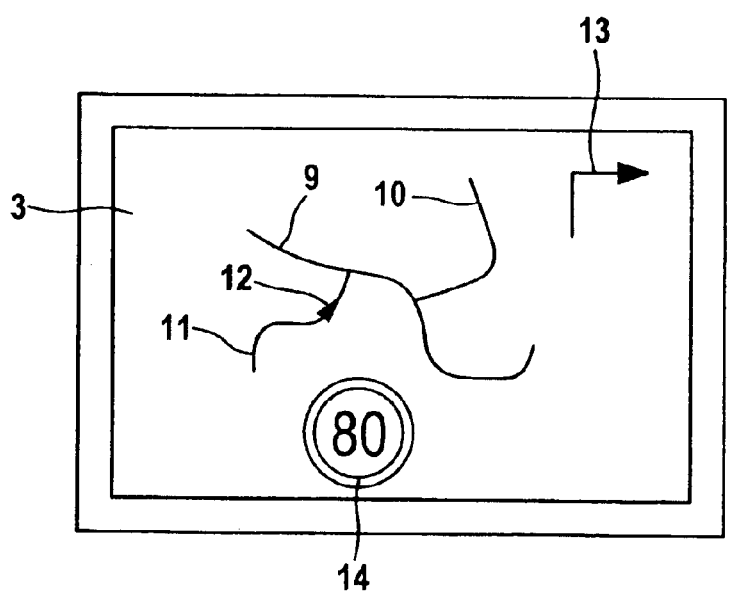
FIG. 2 shows a visual output unit with some information which may be shown.

The monitor 3 is shown in more detail in FIG. 2. It contains various areas for displaying different information. By way of example, a map with various roads 9, 10, 11 is shown on the monitor 3. The vehicle position, matched to the map data by means of map matching, is shown by a cursor 12 within the map representation. In addition, the driver is shown the direction of travel on the monitor 3 by an arrow image. In the case of the arrow image shown in FIG. 2, a right turn at the next junction is envisaged, for example. According to the invention, the speed restriction relevant to the section of road on which the vehicle is currently traveling is additionally shown on the monitor 3 in the form of a road sign 14. The driver is therefore able to find out about the applicable speed restriction at any time.

Figure 3:
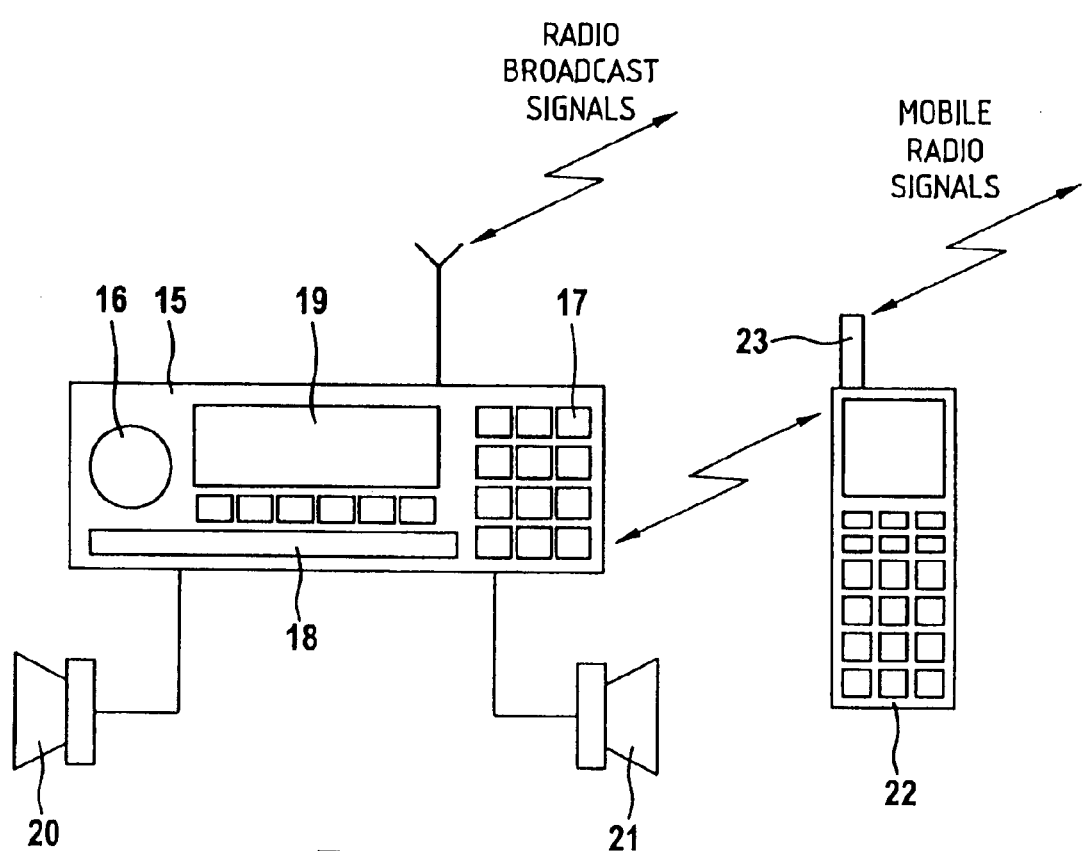
FIG. 3 shows the connection of a navigation unit integrated in a radio set to a mobile radio.

FIG. 3 shows a specific embodiment of the navigation system, which in this case is integrated in a radio set 15. The radio set 15 has control elements 16, 17, the control elements 17 being able to be used to enter a destination for the navigation system, for example. The radio set 15 additionally has a channel 18 having a reader, into which channel 18 a storage element containing the map data and the traffic restrictions associated with the map data can be pushed. By way of example, the storage element may be a CD-ROM storing the map data and the information relating to traffic restrictions. The radio set also has a display 19 which can be used to output the route planning information visually. In addition, the route planning information can be output audibly via the loudspeakers 20, 21.

A transmission/reception device (not shown) integrated in the radio set 15 connects the radio set 15 to a mobile radio telephone 22. The mobile radio telephone 22 likewise has a corresponding transmission/reception device suitable for data transmission between the mobile telephone and the radio set. In this case, the connection may be, in particular, an infrared link or a radio link, for example to a transmission/reception device on the basis of the BLUETOOTH method. The mobile telephone 22 receives mobile radio signals from a stationary transmission/reception device in a mobile radio network via an antenna 23. The stationary transmission device in the mobile radio network stores updated information relating to traffic restrictions which is transmitted by means of the mobile radio signals to the mobile radio telephone 22 and from there to the navigation system integrated in the radio set 15 using a wireless link. The updated data is then stored on a storage element together with the association with a particular section of road (data record of the map data). These functions are controlled by the central processor in the navigation system.

The data containing the traffic restrictions can be stored on the same storage element as the map data or on another storage element. By way of example, it is possible for a writable CD-ROM to be provided as the storage element, which means that both the map data and the current data relating to traffic restrictions can be stored on a storage element with a high storage capacity. Since devices for writing to CD-ROMs are currently still comparatively large and expensive and are thus difficult to integrate in radio sets, the traffic restrictions can also be stored in a further read only memory in the navigation system (ROM or smart card with associated reader), but it is then necessary to ensure that the traffic restrictions are associated with the correct data records containing the map data. Such association is carried out purely by software, however.

The invention has been described with the aid of an illustrative embodiment. Further refinements are familiar to the person skilled in the art. By way of example, it is possible to dispense with a storage element having a high storage density, such as a CD-ROM, and the map data can be stored, likewise using the mobile radio, in a read only memory having a relatively small memory size in the radio set. In addition, the journey route can be ascertained by a computer within the mobile radio network and can be transmitted to the navigation system via the mobile radio network. The same then also applies to the information about the traffic restrictions. In this context, a particularly small storage element will be sufficient in the navigation unit and, in particular, current data is always used.

What is claimed is:

1. A navigation system carried on board a motor vehicle, wherein the system comprises
   (a) a central processor;
   (b) an input and an output unit connected to the central processor;
   (c) an information storage element connected to the central processor, which storage element contains;
      (i) a data record of map data;
      (ii) traffic restriction information applicable to the vehicle only on roadway which is open to travel by the vehicle;
   (d) a display unit connected to the central processor and displaying the traffic restricted information in numeric or alpha-numeric characters constantly during the period of restriction applicability; and
   (e) a wireless mobile telephone operably connected to the storage element in the navigation system, whereby the information about traffic restrictions is retrievable from a stationary transmission station in a mobile radio network and is upgradeable.

2. The navigation system as defined in claim 1, wherein the information regarding traffic restriction is taken into account when calculating a route.

3. The navigation system as defined in claim 1, wherein the navigation system contains an audio output unit and the traffic restrictions are output audibly.

* * * * *